United States Patent [19]

Magnus et al.

[11] Patent Number: 4,608,432
[45] Date of Patent: Aug. 26, 1986

[54] SELF-COMPATIBILIZING POLYESTER POLYOL BLENDS BASED ON POLYALKYLENE TEREPHTHALATE

[75] Inventors: George Magnus, Arlington Heights; Melvin Loeb, Northbrook; Robert J. Wood, Round Lake Park; Brian Kelley, Round Lake Beach, all of Ill.

[73] Assignee: Stepan Company, Northfield, Ill.

[21] Appl. No.: 779,169

[22] Filed: Sep. 23, 1985

[51] Int. Cl.⁴ .................... C08G 63/04; C08G 63/22
[52] U.S. Cl. .................................. 528/274; 521/176; 525/437
[58] Field of Search ............... 528/274; 525/437; 521/176

[56] References Cited

U.S. PATENT DOCUMENTS

| | | | |
|---|---|---|---|
| 4,048,104 | 9/1977 | Svoboda et al. | 260/2.5 |
| 4,223,068 | 9/1980 | Carlstrom et al. | 428/310 |
| 4,233,436 | 11/1980 | Robinson | 528/274 X |
| 4,417,001 | 11/1983 | Svoboda et al. | 521/114 |
| 4,439,546 | 3/1984 | Brennan et al. | 521/43 |
| 4,439,550 | 3/1984 | Brennan et al. | 521/131 |
| 4,439,551 | 3/1984 | Yeakey et al. | 521/131 |
| 4,442,238 | 4/1984 | Zimmerman et al. | 521/164 |
| 4,469,823 | 9/1984 | Yeakey et al. | 521/172 |
| 4,469,824 | 9/1984 | Grigsby, Jr. et al. | 521/173 |
| 4,540,751 | 9/1985 | Lynch et al. | 528/295.5 X |
| 4,546,169 | 10/1985 | Chandler et al. | 528/274 X |
| 4,568,702 | 2/1986 | Mascioli | 521/176 X |

*Primary Examiner*—Lucille M. Phynes
*Attorney, Agent, or Firm*—Hill, Van Santen, Steadman & Simpson

[57] ABSTRACT

Terephthalate polyester polyol blends comprising reaction products of a combination of polyethylene terephthalate, a polybasic carboxylic acid compound, a low molecular weight diol compound and a compatibilizer compound are compatible with fluorocarbon blowing agents. These polyol blends are produced by a simple heating process and are thereafter blendable with various conventional polyols and other additives to make resin prepolymer blends which can be catalytically reacted with organic isocyanates to produce cellular polyurethanes and polyurethane/polyisocyanurates.

31 Claims, No Drawings

SELF-COMPATIBILIZING POLYESTER POLYOL BLENDS BASED ON POLYALKYLENE TEREPHTHALATE

BACKGROUND OF THE INVENTION

1. Field of the Invention

This invention lies in the field of polyols useful in formulating resin prepolymer blends for reaction with organic isocyanates to produce polyurethane and/or polyurethanepolyisocyanurate cellular polymers, and, more particularly, in the field of polyester polyols based on polyalkylene terephthalate which are compatible with high levels of fluorocarbon blowing agents.

2. Prior Art

Aromatic polyester polyols are coming into widespread usage in the manufacture of polyurethane and polyurethanepolyisocyanurate foams. Such polyester polyols are attractive because they tend to be low in cost, yet can produce rigid cellular polymers of excellent properties adapted for many end use applications.

One class of aromatic polyester polyols which has recently become commercially available comprises esters produced by esterifying phthalic acid or phthalic acid anhydride with an aliphatic polyhydric alcohol. For example, a diethylene glycol phthalate is available commercially from Stepan Company, Northfield, Ill. Such liquid product has a desirably low viscosity, a desirably high aromatic ring content, and a desirably low acid number. Even though such product typically has a reactive hydrogen functionality of less than about 3, it catalytically reacts well with organic isocyanates to produce, for example, rigid cellular polyurethanepolyisocyanurate polymers that can have commercially acceptable characteristics.

Another class of aromatic polyester polyols which has recently become commercially available comprises esters produced by reacting polyethylene terephthalate (PET) with alkylene polyols. For example scrap or waste PET can be digested (glycolized) with a diol or triol as taught by Svoboda et al U.S. Pat. No. 4,048,104, or transesterified with a residue from dibasic acid manufacture as taught by Brennan in U.S. Pat. No. 4,439,550, or the like, to produce a polyester polyol product which catalytically reacts well with organic isocyanates to produce, for example, rigid cellular polyurethanepolyisocyanurate polymers that can have commercially acceptable characteristics.

One problem with most such commercially viable aromatic polyester polyols is that they characteristically are poorly compatible with fluorocarbon compounds of the type conventionally used as blowing agents to make such cellular polymers.

The usual solution to this problem has been to admix with such a polyol a separately formed compatibilizing agent in an amount sufficient to produce a resulting mixture with a desired amount of compatibility (solubility) for fluorocarbons. For examples, Koehler et al U.S. Pat No. 4,246,364 use a class of amide diols, while Wood U.S. Pat. No. 4,529,744 issued July 16, 1985 uses a combination of relatively high molecular weight propoxylate ethoxylate compounds with amine and/or amide diol compounds. The amide diols employed by Wood are similar to those taught by Koehler et al. The propoxylate ethoxylate compounds employed by Wood are, in fact, similar to those employed in one preferred mode of practicing the present invention, as hereinbelow described.

The necessity to compound a fluorocarbon compatibilizing agent with aromatic polyester polyol means an extra cost in the formulation of a so-called resin prepolymer blend. Such resin prepolymer blends are conventionally employed in the trade for reaction with organic isocyanates to produce polyurethane and/or polyurethane-polyisocyanurate cellular polymers. Resin prepolymer blends are uniform, homogeneous liquid compositions comprised of polyol, urethane-forming and/or isocyanurate-forming catalyst, fluorocarbon blowing agent, other optional additives, and, in the case of aromatic polyester polyols, a fluorocarbon compatibilizing agent, as is well known to those skilled in the art. A desired quantity of a compatibilizing agent is blended with an aromatic polyester polyol before such fluorocarbon is added, and such a blending step itself adds to the cost of resin prepolymer blend manufacture.

However, the cost of a compatibilizing agent is even more significant. Moreover, the costs of such an agent are escalating. For example, the cost of the cochin oil, which is used as a starting material to make an amide diol as above identified, increased by approximately 60 percent in price in 1984. Unless the cost of producing resin prepolymer blends of aromatic polyester polyols can be controlled and maintained at economically competitive levels, aromatic polyester polyols will not have a commercial place in this field.

There is a need for fluorocarbon compatibilized aromatic polyester polyols which not only are economical to produce, but also are convertible into cellular foams having excellent properties.

Aromatic polyester polyols, especially terephthalate based polyester polyols, are producible either by esterifying aromatic polycarboxylic acids with polyols, or by glycolysis of preformed polymer, as referenced above. The idea of somehow modifying the reaction components without substantially increasing costs so as to result in a polyol product that is directly compatible (self-compatibilized) with fluorocarbons is certainly attractive. Not only would this avoid the need for a separate compatibilizing agent admixing step, but also this could avoid the cost of an added compatibilizing agent.

So far as is known, no one has heretofore produced a class of polyester polyol blends based on polyethylene terephthalate which is both fluorocarbon self-compatibilizing, and also has a combination of low viscosity, low acid number, and low reactive hydroxyl functionality (less than 3). Such a polyester polyol can be formulated into a resin prepolymer blend and then reacted with organic isocyanate to produce cellular polyurethane-polyisocyanurate type polymers of generally commercially acceptable quality.

BRIEF SUMMARY OF THE INVENTION

This invention relates to a new and surprisingly useful class of terephthalate containing polyester polyol blends comprised of reaction products of (a) polyalkylene (preferably polyethylene) terephthalate, (b) at least one low molecular weight aliphatic diol compound, and (c) at least one compatibilizer compound (certain hydrophobic compounds and/or certain nonionic surfactant compounds). These blends are characterized by low acid numbers. The invention also relates to methods for making and using such terephthalate containing polyester polyol blends, and further relates to cellular polyurethane and polyurethane/polyisocyanurate foams made therewith.

Optionally, but preferably, a terephthalate containing polyester polyol blend of this invention is a reaction product of the components above described plus a dibasic carboxylic acid compound.

The polyol blends of this invention are selfcompatibilized, and, in addition, have a desirable combination of other characteristics which make them useful precursors for producing cellular polyurethane and/or polyurethanepolyisocyanurates. So far as is known, no prior art polyester polyol blend reaction product based on polyethylene terephthalate has had such a surprising combination of self-compatibility with other desirable properties.

More particularly, these terephthalate containing polyester polyol blends are reaction products of:

(a) polyethylene terephthalate, low molecular weight aliphatic diol compounds, and certain hydrophobic compounds, (b) polyethylene terephthalate, low molecular weight aliphatic diol compounds, and certain nonionic surfactant compounds, or (c) polyethylene terephthalate, low molecular weight aliphatic diol compounds, certain hydrophobic compounds, and certain nonionic surfactant compounds.

Each of such reaction products optionally but preferably is also a reaction product of a dibasic carboxylic acid compound. The presence of such a compound, particularly when such is in a relatively pure form as a starting material, appears to enhance the capability of producing product polyester polyol blends which are clear liquids. Clear liquid products, even though colored, are generally preferred.

The terephthalate containing polyester polyol blends of this invention can be regarded as being synergistically enhanced in properties especially fluorocarbon solubility characteristics by reason of the presence therein of the above indicated reacted compatibilizer mixture of such hydrophobic compounds and such nonionic surfactant compounds.

The polyol blends of this invention display a characteristic improvement in fluorocarbon compatibility (solubility) which is surprisingly better than the fluorocarbon solubility achievable with corresponding blends which contain neither of the reacted compatibilizer compounds.

Also, the polyol blends of this invention provide characteristic improvements in the properties of cellular polyurethane/polyisocyanurate polymers made therefrom by catalytic reaction with polymer isocyanates. These cellular polymer properties are surprisingly better than the corresponding properties which are achievable in similar cellular polymers made from corresponding polyol blends which do not contain such reacted compatibilizer compounds. Such improved product properties include, for example, tumble friability, compressive strength, burn char, and the like.

The terephthalate containing polyester polyol blends of the present invention are readily compoundable generally with prior art polyols, if desired, and also with the various additives conventionally used in the formulation of resin prepolymer blends.

The polyol blends of this invention are prepared by a single step glycolysis/esterification process which is simple, reliable, and well adapted for practice with conventional chemical processing equipment.

Other and further aims, purposes, features, objects, advantages, utilities, embodiments, and the like will be apparent to those skilled in the art from the teachings of the present specification taken with the appended claims.

DETAILED DESCRIPTION

Polyol Blend Characteristics

The terephthalate containing polyester polyol blends of this invention, as indicated, are made using low molecular weight aliphatic diols. The present polyol blends differ from the above prior art polyethylene terephthalate derived polyester polyols made with aliphatic diols, in that, in effect, a portion of the low molecular weight aliphatic diol needed to achieve a desired (theoretical) stoichiometry between such diol and the polyethylene terephthalate is replaced by at least one compatibilizer compound selected from the group consisting of hydrophobic compounds, nonionic surfactant compounds, and mixtures thereof during formation of such present blends. Thus, the quantity of aromatic rings present in a compatibilizer compound modified based polyethylene terephthalate ester polyol blend of this invention is maintainable at a level closely related to that in the corresponding prior art unmodified polyethylene terephthalate based ester polyols, but the quantity and nature of the aliphatic radicals present in a product polyester polyol blend of this invention are altered to an extent considered desirable or necessary (the exact amount depending upon user wishes) to achieve a level fluorocarbon compatibilization along with other favorable product polyol properties and favorable cellular foam properties. Thus, in general, product polyester polyol blends of this invention are characterized by a surprising combination of properties, as now explained:

Most importantly, the product polyester polyol blends are surprisingly fluorocarbon compatibilized so that they can be formulated into resin prepolymer blends with little or preferably no added (after blend formation) compatibilizing agent in order to produce a desired level of fluorocarbon solubility therein. Such a self-compatibilization is achieved easily and simply by incorporating the characteristically relatively inexpensive compatibilizer compound (hydrophobic and nonionic surfactant material) into a starting mixture of polyethylene terephthalate (or corresponding polybasic carboxylic acid compounds), low molecular weight aliphatic diols, and compatibilizer compounds, as herein explained.

For another thing, these product polyester polyol blends have relatively low viscosities. Viscosities typically fall in the range from about 200 to 50,000 centipoises (measured, for example, at 25° C. with a Brookfield viscometer such as a Model LVT) as is desirable for many end use applications for polyols being used in the manufacture of polyurethane and/or polyurethane/polyisocyanurate cellular products. If desired, the viscosity of a product blend of the present invention can be increased to some desired extent through incorporation into the starting mixture used for glycolysis/esterification a quantity of a polyfunctional (that is, having a functionality higher than 2) carboxylic acid or alcohol, as taught herein.

For another thing, these product polyester polyol blends when converted into polyurethane and/or polyurethanepolyisocyanurate rigid cellular polymers characteristically have favorable product properties including, for example, compressive strength, tumble friability, and the like.

For another thing, these product polyester polyol blends are surprisingly capable of dissolving thereinto significant quantities of added compatibilizer compounds, especially polyalkoxylated nonionic compounds, of relatively high molecular weight. No gelation upon subsequent addition of fluorocarbon is observed when the total amount of compatibility (both reactant and admixed) ranges from 0 to about 30 weight of a total product blend. Thus, when such relatively high molecular weight propoxylate ethoxylate compounds are admixed with preformed prior art terephthalate based polyester polyols (preferably glycolysis) which contain no such reacted compatibilizer compound(s) therein, gelation is prone to occur, particularly when fluorocarbon is subsequently added to the mixture.

In a further development of the present invention, there is provided a preferred class of compatibilizer compound modified terephthalate based polyester polyol blends which are prepared by incorporating into a starting glycolysis/esterification reaction mixture, in accordance with this invention, a relatively high molecular weight nonionic surfactant which is a propoxylate ethoxylate compound. Such a propoxylate ethoxylate compound becomes at least partially chemically reacted into the product terephthalate polyester polyol blend during the glycolysis/esterification. The resulting product polyester polyol blend displays excellent and improved fluorocarbon compatibility characteristics, and cellular polymers produced therefrom display excellent tumble friability characteristics. Also, such a product polyester polyol blend appears to have a lower freezing temperature than corresponding blends produced by merely admixed thereinto after the glycolysis/esterification an equivalent amount of the same propoxylate ethoxylate compound, which is believed to avoid certain processing problems and storage problems in winter. Further, if desired, additional quantities of such a propoxylate ethoxylate compound can be admixed with such a product polyol blend after a glycolysis/esterification without adding some additional agent and without causing gelation upon subsequent addition of fluorocarbon.

The polyester polyol blends of the present invention which contain such reacted and/or unreacted high molecular weight propoxylate ethoxylate compounds characteristically have an unusual and surprising ability to form, when catalytically reacted with organic isocyanates, cellular polyurethane and/or polyurethane-polyisocyanurate foams of not only superior tumble friability, but also superior uniform small sized cell structure.

In general, a self-compatibilized polyester polyol blend of this invention comprises the reaction product of a mixture which comprises on a 100 weight percent total basis:

(A) from about 15 to 80 weight percent of polyalkylene terephthalate, (B) from about 8 to 80 weight percent of at least one low molecular weight aliphatic diol characterized by the generic formula $$HO-R^1-OH \qquad (1)$$

where:

$R^1$ is a divalent radical selected from the group consisting of (a) alkylene radicals each containing from 2 through 6 carbon atoms, and (b) radicals of the formula:

$$-(R^3O)_n-R^3- \qquad (2)$$

where:

$R^3$ is an alkylene radical containing from 2 through 3 carbon atoms, and n is an integer of from 1 through 3, and (c) mixtures thereof, (C) from about 2 to 30 weight percent of at least one compatibilizer compound selected from the group consisting of hydrophobic compounds, nonionic surfactant compounds, and mixtures thereof.

By the term "hydrophobic compound" reference herein is generally made to a compound which contains a substantially nonpolar organic moiety that results in such compound being substantially water insoluble and contains a active hydrogen group, such as an hydroxyl group or a carboxyl group. No hydrophilic moiety is present.

In the practice of the present invention, such a hydrophobic compound is characterized by:

(1) having an equivalent weight of from about 130 to 900, (2) containing from 8 to about 60 carbon atoms per molecule, and (3) containing one group per molecule, selected from the group consisting of carboxyl and hydroxyl.

By the term "nonionic surfactant" reference herein is generally made to a compound which contains both a hydrophobic moiety and a hydrophilic moiety and which has no moieties which dissociate in aqueous solution or dispersion into cations or anions.

In the practice of the present invention, such a nonionic surfactant compound is characterized by:

(1) containing from about 10 to 600 carbon atoms per molecule, (2) containing at least one and not more than four hydroxyl radicals per molecule, and (3) containing from 4 to about 270 radicals per molecule of the formula $$-(R^3O)-$$

where:

$R^3$ is as above defined.

In addition, such a starting mixture optionally but preferably contains at least one dibasic carboxylic acid compound in an amount ranging from greater than 0 up to about 60 weight percent (100 weight percent total mixture basis). Such a dibasic carboxylic acid compound is characterized by:

(1) containing from 2 to about 35 carbon atoms per molecule, (2) containing two carboxyl $$\begin{matrix} \text{O} \\ \| \\ (-\text{C}-\text{O}-) \end{matrix}$$

groups per molecule, (3) containing at least one and no more than two functional groups consisting of a carboxylic acid, a carboxylic acid anhydride, a carboxylic ester, a hydroxyl containing compound, or a mixture thereof.

When a mixture of hydrophobic compound with nonionic surfactant compound is employed, preferably such mixture is characterized by having a weight ratio of said hydrophobic compound to said nonionic surfactant compound in the range from about 0.1 to 10.

Preparation Conditions

In general, a self-compatibilized polyester polyol blend of this invention is prepared by heating at a temperature ranging from about 180° to 240° C. a starting mixture as above characterized.

Such heating of a starting mixture is continued until a liquid reaction product is produced which is characterized by having:

(A) an hydroxyl number ranging from about 200 to 500, (B) an acid number ranging from about 0.1 to 7, (C) a saponification value ranging from about 130 to 400, and (D) a viscosity ranging from about 200 to 50,000 centipoises measured at 25° C. using a Brookfield viscometer.

Similarly "hydroxyl number" is defined as the number of milligrams of potassium hydroxide required for the complete neutralization of the hydrolysis product of a fully acetylated derivative prepared from one gram of a polyol or a mixture of polyols.

The term "hydroxyl number" is also defined by the equation:

$$OHV = \frac{56.1 \times 1000 \times F}{M.W.}$$

wherein;

OHV is the hydroxyl number (of the polyol or polyol blend),

F is the average functionality (i.e., the average number of active hydroxyl groups per molecule of the polyol or polyol blend), and M.W. is the average molecular weight of the polyol or polyol blend.

Similarly "acid number" is defined by the number of milligrams of potassium hydroxide required to neutralize the acid material present in one gram of sample.

The "saponification value" is defined by the number of milligrams of potassium hydroxide required to react with the ester groups present in one gram of sample. To determine saponification value, the American Chemist Society official Method no. C-d-3-25 is preferably employed.

Reaction (heating) time can vary, but typically ranges from about 8 to 16 hours, but longer and shorter reaction times can be used depending upon temperature, starting mixture composition, and like factors, without departing from the spirit and scope of the invention.

Process conditions are summarized in Table I below:

TABLE I

| | Process Conditions* | |
|---|---|---|
| Process Variable | Broad | Presently Preferred |
| 1. Temperature | 180–240° C. | 210–230° C. |
| 2. Pressure | 10 to 760 mm of Hg | autogeneous |

*The reactants are agitated during processing and preferably sparged with an inert gas (e.g. nitrogen) to aid in the removal of water vapor.

Starting Mixture

The composition comprising a starting mixture employed in the practice of this invention (as indicated above) is summarized in Table II below:

TABLE II

| | Starting Mixture* | | | |
|---|---|---|---|---|
| | | Range (100 wt % total basis) | | |
| Item No. | Reactive Component | Broad | Preferred | More Preferred |
| 1 | Polyalkylene terephthalate | 15–80 | 30–40 | 25–35 |
| 2 | Aliphatic Diol (formula (1)) | 8–80 | 30–65 | 50–60 |
| 3 | Compatibilizer Compound | 2–30 | 5–25 | 10–20 |
| 3a | hydrophobic compound | 0–30 | 2–20 | 5–15 |
| 3b | nonionic surfactant | 0–30 | 2–15 | 2–10 |
| 3c | high mol. wt. propoxyethoxy compound | 0–30 | 0–10 | 0–5.0 |
| 4 | Dibasic carboxylic acid | 0–60 | 2–30 | 5–15 |
| 5 | Aliphatic polyol (other) | 0–10 | 0–4 | 0–3 |
| 6 | Aromatic polycarboxylated acid compound (other than dibasic) | 0–10 | 0–8 | 0–5 |
| 7 | Aliphatic polycarboxylated acid compound (other than dibasic) | 0–10 | 0–8 | 0–5 |

*Values herein identified for any given mixture must conform with the composition limits disclosed herein above for a starting mixture of this invention.

A starting mixture always contains the reactive components identified in Table II as items (1) through (3). Generally, the sum total of all compatibilizer compounds present in a starting mixture ranges from about 2 to 30 weight percent (based on 100 wt % of total starting mixture), but the individual respective quantities of each of the compatibilizer compounds identified as 3a, 3b, and 3c in Table II can range as shown within this general range. A starting mixture can optionally contain a mixture of 3a and 3b as above indicated, and 3c can be present either as the principle nonionic surfactant or as a component of a mixture of nonionic surfactants.

In general any preformed polyalkylene terephthalate polymer can be used as a starting material in the practice of this invention. For reasons of availability, polyethylene terephthalate is presently preferred. Polyalkylene terephthalate polymers principally polyethylene terephthalate (PET) polymers, are available in various forms, such as scrap, from films, fibers, containers, and the like. Any preformed polyethylene or polyalkylene terephthalate polymer which contains the moiety:

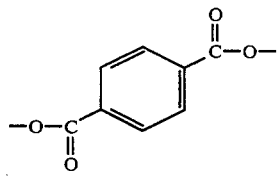

is suitable for use in the practice of this invention.

Such a preformed terephthalate polymer may be in any particulate form. Any chopping or pulverizing process which produces small bits of solid PET is appropriate to produce a starting PET for use herein. Slurry solvents can be used, if desired.

A class of suitable aliphatic diols is shown in formula (1) (above).

Examples of suitable aliphatic diols of formula (1) include ethylene glycol, propylene glycol, dipropylene glycol, trimethylene glycol, butylene glycols, 1,2- cyclohexanediol, poly(oxyalkylene) polyols derived by the condensation of ethylene oxide, propylene oxide, or any combination thereof, and the like. As those skilled in the art will appreciate, in the preparation of mixed poly(oxyethylene-oxypropylene) polyols, the ethylene and propylene oxides may be added to a starting hydroxyl-containing reaction either in admixture or sequentially. Mixtures of such diols can be employed, if desired. A presently most preferred aliphatic diol of formula (1) is diethylene glycol.

Any hydrophobic compound as above characterized can be employed so far as now known, such as monocarboxylic acids (especially fatty acids) lower alkanol esters of monocarboxylic acids (especially fatty acid esters), triglycerides (especially fats and oils), alkyl monohydroxy alcohols (for example, those containing from 8 to 18 carbon atoms per molecule), substituted phenols, for example, alkyl phenols, monohydroxy polyalkylene glycol condensates with greater than two carbon atoms per repeating unit, and the like. Mixtures of different hydrophobic compounds can be employed if desired.

Examples of fatty acids include caproic, caprylic, capric, lauric, myristic, palmitic, stearic, oleic, linoleic, linolenic, ricinoleic mixtures thereof, and the like.

Examples of fatty acid methyl esters include methyl caproate, methyl caprylate, methyl caprate, methyl laurate, methyl myristate, methyl palmitate, methyl oleate, methyl stearate, methyl linoleate, methyl linolenate, mixtures thereof, and the like.

Examples of alkyl alcohols include decyl, oleyl, cetyl, isodecyl, tridecyl, lauryl, and mixed mixtures thereof, and the like.

Examples of fats and oils include castor, coconut (including cochin), corn, cottonseed, linseed, olive, palm, palm kernel, peanut, safflower, soybean, sunflower, tall oil, tallow, mixtures thereof and the like.

Other suitable acids include 2-ethyl hexanoic acid, and the like.

Presently preferred types of hydrophobic compounds include alkyl alcohols, fats and oils, and the like. Examples of particular presently preferred such hydrophobic compounds include decyl alcohol, soybean oil, and the like.

Any nonionic surfactant compound as above characterized can be employed so far as is now known. In general, in the practice of the present invention, it is preferred that a nonionic surfactant contain from 4 to about 270 individual oxyalkylene groups per molecule with the oxyalkylene groups typically being selected from the group consisting of oxyethylene and oxypropylene.

The hydrophobic portion of a nonionic surfactant is preferably derived from at least one starting compound which is selected from the group consisting of:

(a) Fatty alcohols containing from about 6 to 18 carbon atoms each, (b) Fatty amides containing from about 6 to 18 carbon atoms each, (c) Fatty amines containing from about 6 to 18 carbon atoms each, (d) Fatty acids containing from 6 to 18 carbon atoms each, (e) Phenols and/or alkyl phenols wherein the alkyl group contains from about 4 to 16 carbon atoms each, (f) Fats and oils containing from 6 to about 60 carbon atoms each, (g) polyoxypropylene glycols containing from 10 to 70 moles of propylene oxide, and (h) mixtures thereof.

In making a nonionic surfactant, as is known, such a starting compound is sufficiently alkoxylated to provide a desired hydrophilic portion. Typically, alkoxylation results in chains totaling from about 3 to 125 moles of alkylene oxide per molecule with the alkylene oxide preferably being selected from the group consisting of ethylene oxide, propylene oxide, and mixtures thereof.

One class of nonionic surfactants employable in the practice of this invention is characterized by the formula:

$$RO(CH_2CH_2O)_nH \qquad (4)$$

where:

R is a radical selected from the group consisting of alkyl phenyl radicals wherein the alkyl group in each such phenyl radical contains about five to eighteen carbon atoms, and alkyl radicals each containing from two through eighteen carbon atoms, and n is a positive whole number which is sufficient to keep the molecular weight of the product surfactant below about 1500.

It is presently preferred that all nonionic surfactants employed in the practice of the present invention be characterized by containing both units of ethylene oxide and of propylene oxide. Thus, the hydrophobic part of a molecule can contain mainly recurring propylene oxide units, or, in some cases, block units of largely propylene oxide, with some ethylene oxide being present. Thus, nonionic surfactants employed in the practice of this invention preferably contain both condensed ethylene oxide and propylene oxide units.

One preferred class of nonionic surfactants comprises at least one relatively high molecular weight propoxylate ethyoxylate compound having a molecular weight ranging from about 1500 to 12000. Preferably such a compound contains at least one block polyoxypropylene group containing at least about 10 propoxy units and also at least one block polyoxyethylene group containing at least about 20 ethoxy units.

One particularly preferred class of nonionic surfactant is characterized by having:

(1) a molecular weight of at least from about 3000 to 8000, (2) a solubility in diethylene glycol phthalate to such an extent that at least 5 parts by weight are soluble in each 100 parts by weight of a diethylene glycol phthalate (which is a stoichiometric reaction product of one mole of phthalic acid anhydride with two moles of diethylene glycol (or equivalent), (3) at least one block polyoxypropylene group which contains from about 10 to 70 repeating propoxy units, (4) at least one block polyoxyethylene group which contains from about 15 to 200 repeating ethoxy units, and (5) both a hydrophobic moiety and a hydrophilic moiety.

In such a particularly preferred such nonionic surfactant as above characterized, the total alkoxyl content includes at least about 40 weight percent of ethylene oxide, and preferably the ethylene oxide content ranges from about 55 to 75 weight percent, and most preferably the ethylene oxide content ranges from about 60 to 70 weight percent. Preferably such a nonionic surfactant is end capped with at least one ethylene oxide group.

In general, a "low molecular weight nonionic surfactant compound" references herein such a compound which has a molecular weight below about 2000. Thus, a "high molecular weight nonionic surfactant" references such a compound which has a molecular weight greater than about 2000.

If desired, mixtures of high and low molecular weight nonionic surfactants can be employed.

Optionally, after its formation by a heating step as described herein, a liquid product polyester polyol blend of this invention can be admixed with, and/or have dissolved or dispersed therein, for each 100 parts by weight of such liquid polyol blend, from 0 to about 30 parts by weight of at least one such high molecular weight propoxylate ethoxylate compound. Such an admixture and dissolution is preferably carried out while maintaining a temperature ranging from about 50° to 100° C.

However, the total quantity of such high molecular weight propoxylate ethoxylate compound present in such a product polyol blend, whether such compound is present during such heating, or is subsequently admixed with such a polyol blend, as indicated, ranges from greater than 0 to about 30 weight percent on a 100 weight percent total liquid polyol blend product basis.

When such a starting mixture containing dibasic carboxylic acid compound(s) are employed, it is preferred that such mixture contain about 2 to 30 weight percent (on a 100% by weight total such mixture basis) of dibasic carboxylic acid compound(s) which can include dimer acids.

In addition to such polyethylene terephthalate compound, such aliphatic diol, such compatibilizer (hydrophobic compound, and/or such nonionic surfactant compound), and optional dibasic acid compound, a starting mixture can also, if desired, contain minor amounts (generally less than about 10% by weight based upon total starting mixture weight) of other reactive components such as shown in Table II. For example, polyhydroxylated and/or polycarboxylated compounds, that is, compounds having at least two or more functional hydroxyl and/or carboxyl groups per molecule can be present. Such compounds can be used, if desired, to increase and to regulate viscosity of a product polyol blend. Thus, polyols (especially aliphatic polyols), polycarboxylated aromatic acid compounds, polyaromatic ester compounds, and corresponding esters, and polycarboxylated aliphatic acid compounds and corresponding esters can be employed, as shown in Table II above.

For example, such a starting mixture can optionally incorporate low molecular weight polyols (that is, compounds which preferably contain 6 or less carbon atoms per molecule, but which contain at least three or more hydroxyl groups per molecule). Examples of such polyols comprise glycerol, 1,1,1-trimethylolpropane, 1,1,1-trimethylolethane, pentaerythritol, sorbitol, mixtures thereof, and the like.

For another example, such a starting mixture can optionally incorporate aromatic polycarboxylic acid or acid anhydride compounds or aromatic polycarboxylic esters that is, mixtures which contain aromatic carboxylated compounds containing at least three carboxyl groups per molecule (including anhydrides) and which preferably contain less than 13 carbon atoms per molecule. Examples of such aromatic polycarboxylated acid compounds and esters comprise phthalic anhydride residues, trimellitic anhydride, trimellitic acid, dimethyl terephthalate residues, mixtures thereof, and the like. Of interest in this regard are the acidic residues resulting from the manufacture of phthalic anhydride and of terephthalic acid or dimethyl terephthalate.

One presently preferred such mixture comprises a dimethyl terephthalate esterified oxidate residue, or a resinous reaction product of a formula (1) glycol (especially diethylene glycol) with a dimethyl terephthalate esterified oxidate residue such as is described for example, in one or more of U.S. Pat. Nos. 3,647,759; 4,237,238; 4,444,915;' 4,444,916; 4,469,817; 4,469,821; 4,442,238; 4,444,918; and the like.

For another example, such a starting mixture can optionally incorporate aliphatic polycarboxylic acid, acid anhydride compounds, or alkyl ester compounds or residues from the manufacture of aliphatic polycarboxylated acids or esters, that is, aliphatic carboxylated compounds which contain at least two carboxyl groups per molecule (including anhydrides) and which preferably contain less than 9 carbon atoms per molecule. Examples of such aliphatic polycarboxylated acid compounds comprise adipic acid, glutaric acid, succinic acid, their respective alkyl esters, mixtures thereof, and the like.

Terephthalate Polyester Polyol Product Blends

A liquid product blend of this invention is a reaction product of a starting mixture as above described. Preferred preparation conditions are as above described. Such a reaction product has characteristics as above indicated and as further summarized in Table III below:

TABLE III

Product Phthalate Polyester Polyol Blends

| Item | Characteristic or Property | Range | | |
|---|---|---|---|---|
| | | Broad | Preferred | More Preferred |
| 1. | Hydroxyl number | 200–500 | 225–400 | 250–300 |
| 2. | Acid number | 0.10–7.0 | 0.2–5.0 | 1.0–3.0 |
| 3. | Saponification value | 130–400 | 150–350 | 250–310 |
| 4. | Viscosity (centipoises)* | 200–50,000 | 500–20,000 | 1000–5000 |

*measured with a Brookfield viscometer at 25° C.

Characteristically, a polyol blend of this invention is a reaction product of the respective above indicated quantities of starting materials. Such a polyol blend is also a reaction product of any other minor additional components present in a starting mixture, as described above. In effect, during the heating (glycolysis esterification), the terephthalate polymer material becomes degraded by the hydroxyl groups of the polyhydric alcohol compounds present, thereby producing terephthalate polyester polyol blends. When a compatibilizer compound present in a starting mixture contains carboxyl groups, the resulting reaction product or polyol blend further contains esters of such compounds. A polyol blend reaction product is thus inherently a complex mixture of various esterified alcohols and certain other compounds.

The quantity of terephthalate polyester polyol present in any given product is generally proportional to the quantity of (polyethylene terephthalate) present in a starting mixture. A terephthalate polyester polyol blend product is formed not only by the esterification reaction of aliphatic diol of formula (1) with polybasic acidic material, but also by glycolysis reactions of polyethylene terephthalate.

The fact that a product of this invention is an interreacted system derived from the starting components present in a starting mixture can be demonstrated by an convenient means. When, for example, a starting mixture and a corresponding product mixture are examined by HPLC (high pressure liquid chromatography) it is found that the reaction product has a most substantially altered composition compared to that of the starting mixture.

Also, HPLC analysis shows that a polyol blend reaction product of this invention has a substantially different composition from a mixed composition which has been prepared by admixing together a polyethylene terephthalate starting material glycolized with only an aliphatic diol of formula (1).

Further, HPLC analysis of a product polyol blend appears to characteristically show peaks in the 15 to 17 minute range when using a Regis octadecylsilane column with 5 micron packing and having a length of about 25 centimeters. Such peaks appear to be absent when mere physical mixtures of nonionic surfactant compound and/or hydrophobic compound are present in a terephthalate polyester polyol blend made only with low molecular weight diol (e.g. formula (1) diol) are involved.

A post formation admixed hydrophobic compound or nonionic surfactant compound is characteristically soluble in a terephthalate polyester polyol blend of this invention. In contrast, if, for example, a hydrophobic compound is admixed with a prior art glycolyzed polyethylene terephthalate then a two-phased mixture results.

It is a feature of the present invention that one can admix with and dissolve in a product blend as characterized in Table III above additional quantities of compatibilizer compound. Thus, for each 70 parts by weight of such product blend, from 0 to about 30 parts by weight of at least one such compatibilizer compound is admixable with and dissolved therein provided that the total quantity of compatibilizer compound (both reacted and admixed) ranges from greater than 0 to about 30 parts by weight from each 100 parts by weight of such product blend. Preferably, the admixed compatibilizer is a nonionic surfactant and more preferably such is a nonionic propoxylate ethoxylate compound. Such a resulting mixture generally retains the characteristics shown in Table III.

Furthermore, in the case of the class of preferred liquid reaction products of this invention which have incorporated into a starting mixture a high molecular weight nonionic propoxylate ethoxylate compound, it is found by HPLC analysis that such products display a characteristically different composition from that shown by, for example, a diethylene glycol glycolized polyethylene terephthalate polyester polyol to which has been added after formation such a low or high molecular weight nonionic compound.

The Freon solubility capabilities of a product polyester polyol blend, based on polyethylene terephthalate or of a resin prepolymer blend made therefrom, can be readily determined, particularly when such a polyol blend is a clear liquid. Presently preferred product polyols of this invention are clear liquids, although their color can range from water white (or colorless) to dark brown or amber. Product polyols produced by incorporating into a starting mixture a residue from the manufacture of phthalic anhydride or a residue from the manufacture of dimethyl terephthalate tend to have a black color which can characteristically be very dense. It is presently difficult if not impossible to measure accurately by known direct techniques the Freon solubility capability or characteristics of such a black liquid product polyol. For present purposes generally, freon solubility is conveniently directly measured or defined as the maximum amount of trichlorofluoromethane (known commercially as Freon 11, available from the duPont Company) which can be dissolved in a polyol blend. However, the dark or black colored product polyols do produce improved cellular polymers when catalytically reacted with isocyanates, as taught herein, such polymers apparently have excellent physical characteristics, such as tumble friability, burn char, and the like.

Resin Prepolymer Blends

Resin prepolymer blends of this invention can be easily and conveniently prepared from product polyol blends of this invention by admixing therewith a urethane-forming, an isocyanurate-forming, and/or mixed polyurethane/polyisocyanurate forming catalyst or catalyst system. In addition, a fluorocarbon blowing agent is mixed therewith (dissolved therein).

Many different types of resin prepolymer blends using polyols of this invention can be prepared using the additives, polyols, and know-how familiar to those skilled in the art. The polyols of this invention appear to be readily blendable with such materials.

One presently preferred and illustrative class of prepolymer resin blend formulations which incorporate polyol blends of this invention and which is now believed to be particularly suitable for making polyisocyanurate rigid foams is characterizable as shown in the following Table IV:

TABLE IV

Preferred Resin Precursor Blends For Polyisocyanurate Foams (100 weight percent basis)

| Item No. | Component | wt. % Preferred range | wt. % More Preferred Range |
|---|---|---|---|
| (A) | polyol blend | 20–65 | 40–60 |
| (B) | trimerization catalyst | 1.0–7.0 | 1.5–5.0 |
| (C) | cell stabilizing surfactant | 0–5.0 | 1.0–2.0 |
| (D) | fluorocarbon blowing agent | 20–60 | 25–40 |
| (E) | low molecular wt. nonionic surfactant compounds* | 0–20 | 0–10 |
| (F) | high molecular wt. nonionic surfactants* | 0–20 | 0–10 |
| (G) | other additives | 0–15 | 0–10 |

*admixed after polyol blend formation

One presently preferred and illustrative class of prepolymer resin blend formulation which incorporate polyol blends of this invention and which is now believed to be particularly suitable for making polyurethane rigid foams is characterizable as shown in the following Table V.

TABLE V

Preferred Resin Precursor Blends For
Polyurethane Foams
(100 weight percent basis)

| Item No. | Component | wt. % Preferred range | wt. % More Preferred Range |
|---|---|---|---|
| (A) | polyol blend | 20–65 | 40–60 |
| (B) | urethane forming catalyst | 0.5–10.0 | 1.0–4.0 |
| (C) | cell stabilizing surfactant | 0.5–3.0 | 1.0–2.0 |
| (D) | fluorocarbon blowing agent | 0–30 | 5–20 |
| (E) | water | 0–20.0 | 0–2 |
| (F) | low molecular wt. nonionic surfactants* | 0–10 | 0–5 |
| (G) | high molecular wt. nonionic surfactants* | 0–10 | 0–5 |

*admixed after polyol blend formation

Preferably the viscosity of such a B-side resin prepolymer blend formulation of Table IV or V ranges from about 100 to 2000 centipoises at 25° C. (measured, for example, with a Brookfield viscometer) and the hydroxyl number thereof falls in the range from about 40–300.

EMBODIMENTS

The present invention is further illustrated by reference to the following examples. Those skilled in the art will appreciate that other and further embodiments are obvious and within the spirit and scope of this invention from the teachings of these present examples taken with the accompanying specification. Unless otherwise indicated all product polyol blends of this invention hereinbelow described have a saponification number of from about 130 to 400.

Starting Materials

EXAMPLE A

A phthalate-terephthalate polyester polyol for testing and comparison purposes is prepared as follows:

To a 3 liter, four-neck, round-bottom flask equipped with a stirrer, thermometer, nitrogen inlet tube, and a distilling head consisting of a straight adapter with a sealed-on Liebig condenser there is added 444 grams (3 moles) of phthalic anhydride, 954 grams (9 moles) of diethylene glycol and 576 grams of polyethylene terephthalate. The mixture is heated to 220° C. with stirring and kept at this temperature until the rate of water being removed slowed down.

Stannous octoate (200 ppm) is then added to the mixture and the heating continued until the acid number reaches 0.9. The reaction mixture is then cooled to room temperature and analyzed. The hydroxyl number is found to be 324 and the acid number 0.9.

This product is a colorless liquid which has a hydroxyl number of about 324 and has a viscosity of about 3600 centipoises at 25° C. measured with a Brookfield viscometer.

EXAMPLE B

A specimen of a phthalic anhydride bottoms composition is obtained from Stepan Company having:

(a) a phthalic anhydride content of about 60 weight percent (total composition basis), (b) a hydroxyl number estimated to be about 0, and (c) an acid number estimated to be about 700.

The phthalic anhydride bottoms used as a starting material in the practice of the present invention results from the process of converting o-xylene to phthalic anhydride.

Distillation of the reaction product known as "crude" or "PA crude" results in a first distillate known as "light ends" or "phthalic anhydride light ends", a second distillate comprising substantially pure phthalic anhydride and a residue known as bottoms or phthalic anhydride bottoms. The crude, the light ends and the bottoms can each be regarded as having a somewhat variable composition, such compositional variations being the result of variations in the starting o-xylene feed, and also of variations in the exact conditions employed for the respective process steps.

In actual commercial practice, it is believed that, in a bottoms composition, the quantity of phthalic anhydride present can range from a low of about 10 weight percent to a high of about 99 weight percent on a 100 weight percent total bottoms basis, with the balance up to 100 weight percent thereof in any given bottoms compositions being mainly trimellitic acid and/or trimellitic acid anhydride plus insolubles.

Similarly, in actual commercial practice, it is believed that, in a light ends composition, the quantity of phthalic anhydride present can range from a low of about 45 weight percent up to a high of about 90 weight percent on a 100 weight percent total light ends basis, with the balance up to 100 weight percent thereof in any given light ends composition being mainly benzoic acid (or benzoic acid anhydride), and maleic acid anhydride (or maleic acid).

EXAMPLE C

A starting phthalic anhydride bottoms composition is selected which has the following characteristics:

| Characteristics | Broad Range | Preferred Range |
|---|---|---|
| hydroxyl number | about 0 | about 0 |
| acid number | 100–750 | 450–750 |
| phthalic anhydride content | 10–99 wt % | 50–95 wt % |

In the foregoing table, the phthalic anhydride weight percentage is based upon total compositional weight of a starting phthalic anhydride bottoms composition in the esterification procedure.

Alternatively, a crude or light ends composition is employed. With such a starting phthalic anhydride bottoms composition is admixed at least one polyol of formula (1) above to produce an initial mole ratio of said polyol to said phthalic anhydride bottoms composition in the range from about 1.9 to 3.0 based upon an estimate of the total acid (e.g., carboxylic acid and/or carboxylic acid anhydride) content of said phthalic anhydride bottoms composition. A presently most-preferred polyol for reaction with phthalic anhydride bottoms starting material is diethylene glycol.

Although phthalic anhydride bottoms comprise mainly phthalic acid anhydride, the remaining components of the phthalic anhydride bottoms mainly appear to comprise components which are acidic in nature and which react with a polyol of formula (1) presumably to produce ester by-products, although the exact composition of the reaction product of a polyol of formula (1)

and phthalic anhydride bottoms is at this time not known.

A condensate of diethylene glycol phthalic anhydride bottoms composition of Example B and polyethylene terephthalate for testing and comparison purposes is prepared as follows:

To a 3-liter, four-neck, round-bottom flask equipped with a stirrer, thermometer, nitrogen inlet tube and a distilling head consisting of a straight adapter with a sealed-on Liebig condenser there is added at ambient temperature and pressure 508.8 grams of the above pulverized phthalic anhydride bottoms, 1093.1 grams (10.31 moles) of diethylene glycol and 660 grams of polyethylene terephthalate. The mixture is heated to 220° C. and kept at this temperature until the acid number of the reactant mixture is found to be about 3.5. The mixture is then cooled to room temperature and the hydroxyl number of the relatively viscous black liquid product is determined and found to be about 325. The mixture has a viscosity of about 28,000 centipoises at 25° C. measured using a Brookfield viscometer.

EXAMPLE D

An esterified dibasic acid is obtained from Dupont under the trade description "DBE-2". This material is manufactured from a mixed acid co-product stream typically composed of 20-35% dimethyl adipate, 65-80% dimethyl glutarate, and 0-3% dimethyl succinate. This material has the following characteristics:
Molecular weight: about 163
Acid number: 1 max
Ester Content; wt % 99.5 min.

EXAMPLE E

A 17006 pound batch of presently preferred nonionic block propoxylate ethoxylate of nonyl phenol is produced by first charging 3,900 lbs of appropriate nonyl phenol feed stock to an appropriate alkoxylation reactor of the proper size. This material is then heated to 110° C. and an appropriate amount of potassium hydroxide catalyst is added. After the addition of the catalyst, 4106 pounds of propylene oxide (about 35 moles of addition) is added slowly. Care should be taken to maintain a reaction temperature of between 110° C. to 160° C. during the addition of the propylene oxide. After this addition, the reactor is brought to approximately 110° C. and about 9000 pounds of ethylene oxide (about 65 moles of addition) are added to the reactor very slowly. This is a very exothermic reaction and care should be taken to maintain a reaction temperature of between about 110° to 160° C. The ethoxylation is terminated when the appropriate degree of ethoxylation is achieved; this should occur after approximately all of the 9000 pounds of ethylene oxide are added to the reactor. Proper agitation in the alkoxylation should be maintained during both ethylene oxide and propylene oxide additions. The product contains about 65 moles of condensed ethylene oxide in block form and about 35 moles of condensed propylene oxide in block form.

The product has the following characteristics:
molecular weight: about 4800
hydroxyl number: about 12
functionality: about 1
physical state: solid at 25° C.

EXAMPLE F

A mixed ethoxylated propoxylated-ethoxylated butanol is obtained as "Tergitol XH" from Union Carbide Company. This product is believed to have the following approximate characteristics:
molecular weight: about 2400 to 3500
hydroxyl number: about 13 to 24
functionality: about 1
physical state: solid at 25° C.
moles ethylene oxide condensed: about 20 to 50
moles propylene oxide condensed: about 20 to 50
See U.S. Pat. No. 3,078,315

EXAMPLE G

An ethoxylated propoxylate ethoxylate is obtained as "Pluronic P-75" from BASF Wyandotte Company. This product is believed to have the following approximate characteristics:
molecular weight: about 3500 to 14000
hydroxyl number: about 8 to 32
functionality: about 2
physical state: solid at 25° C.
moles ethylene oxide condensed: 30 or more
moles propylene oxide condensed: 30 or more

EXAMPLE H

An organic polyisocyanate trimerization catalyst is obtained under the trade designation "Hex-Cem 977" from the Mooney Chemical Company. This catalyst is believed to comprise potassium octoate in glycol solution.

EXAMPLE I

A silicone cell stabilizing surfactant is obtained under the trade designation "DC-193" from Dow Corning Company. This surfactant is believed to be comprised of a polyalkylene oxide silicone.

EXAMPLE J

A trimerization catalyst is obtained under the tradename "TMR-2" from Air Products Company. The catalyst is believed to be an ammonium compound of an organic base.

EXAMPLE K ("C-68 Methyl Esters") comprises (82% of methyl oleate, 16% methyl palmitate, 2% unknowns) available from Stepan Company.

EXAMPLE L ("Amidox C-5") Ethoxylated Cocoamide available from Stepan Company

EXAMPLE M ("Eastman Methyl Esters") Mixture of 3.1% methyl laurate, 1.1% methyl myristate, 18.8% methyl palmitate, 13.7% methyl stearate, 34.7% methyl oleate, 28.4% methyl linoleate, available from Eastman Chemical Company

EXAMPLE N

Varonic K-215 Ethoxylated cocoamine available from Sherex Chemical Company

EXAMPLE O ("Pluronic P-65") Ethoxylated propoxylate ethoxylate surfactant available from BASF Corporation

EXAMPLE P ("Makon 6"), Ethoxylated nonyphenol available from Stepan Company

EXAMPLES OF THE INVENTION

EXAMPLE 1

Preparation Of A Polyol Blend From An Eastman Methyl Ester, Phthalic Anhydride, Diethylene Glycol, and Polyethylene Terephthalate To a five liter, four-neck, round-bottom flask equipped with stirrer, thermometer, Barrett distilling receiver, condenser, and nitrogen inlet tube there is charged 834.6 grams of phthalic anhydride, 1677.7 grams of diethylene glycol, 604.9 grams of Eastman methyl ester and 1082.7 grams of polyethylene terephthalate.

This mixture is heated to 225° C. with constant agitation and with a constant nitrogen sparge. Theoretically, 101.5 grams of water and 65.4 grams of methanol (total 166.9 grams of material) forms and substantially all of such formed material is taken off at the distilling receiver. After this distillate material is collected, 200 ppm of stannous octoate is added to the flask as a glycolysis/esterification catalyst. Additional material removed from the distilling receiver is replaced by an equal weight of diethylene glycol. The heating is continued until the acid value of the product liquid is less than 4.0. This reaction (heating) is stopped at an acid value of 2.7. The product polyol has a hydroxyl number of 250.1, a viscosity of 2600° cps at 25° C., and contains 0.06% water.

EXAMPLE 2

Preparation Of A Polyol Blend From Example P Material, Phthalic Anhydride, Diethylene Glycol and Polyethylene Terephthalate To a three liter, four-neck, round-bottom flask equipped with stirrer, thermometer, Barrett distilling receiver, condenser, and nitrogen inlet tube there is charged 381.1 grams of phthalic anhydride, 711.2 grams of diethylene glycol, 513.4 grams of Example P material (Makon 6) and 494.4 grams of polyethylene terephthalate. This mixture is heated to 225° C. with constant agitation and with a constant nitrogen sparge. After approximately 95% of the theoretical water has been removed, 200 ppm of stannous octoate is added to the flask. Any additional material taken from the distilling receiver is replaced by an equal weight of diethylene glycol. The reaction is carried out until the acid value is approximately 0.5 and the hydroxyl number is about 253.6. The viscosity is found to be 3382 cps at 25° C. measured using a Brookfield viscometer (model LVT).

To further improve the fluorocarbon compatibility, and to further improve the physical properties of a polyurethanepolyisocyanurate foam prepared from such a polyol blend as produced herein, a high molecular weight propoxylate ethyoxylate nonionic surfactant of Example E is admixed with such polyol blend at the rate of about 5 parts by weight per 70 parts by weight of said polyol blend.

EXAMPLE 3

Preparation Of A Polyol Blend Of Decyl Alcohol Example E Material, Example D Material, Diethylene Glycol and Polyethylene Terephthalate To a three liter, four-neck, round bottom flask equipped with stirrer, thermometer, Barrett distilling receiver, condenser, and nitrogen inlet tube, there is charged 576.0 grams of Example D material (DBE-2) 791.8 grams of diethylene glycol, 322.1 grams of decyl alcohol, 107.3 grams of Example E material and 576 grams of polyethylene terephthalate. This mixture is heated to 225° C. with constant agitation and with a constant nitrogen sparge. Theoretically, 226.2 grams of methanol forms and substantially all of such formed material is taken off at the distilling receiver. After this material is collected, 200 ppm of stannous octoate is added to the flask as a glycolysis/esterification catalyst. Additional material removed from the distilling receiver is replaced by an equal weight of diethylene glycol. The heating is carried out until the acid value of the product liquid polyol reaches 0.5. The product polyol has a hydroxyl number of 252.4, a viscosity of 500 cps at 25° C. and contains 0.02% water.

EXAMPLE 4

Preparation Of A Decyl Alcohol, Example E Material, Phthalic Anhydride, Diethylene Glycol and Polyethylene Terephthalate To a three liter, four-neck, round bottom flask equipped with stirrer, thermometer, Barrett distilling receiver, condenser, and nitrogen inlet tube, there is charged 359.4 grams of phthalic anhydride, 689.8 grams of diethylene glycol, 275.0 grams of decyl alcohol, 220.0 grams of Example E material and 699.4 grams of polyethylene terephthalate. This mixture is heated to 225° C. with constant agitation and with a constant nitrogen sparge. Theoretically, 43.7 grams of water forms and substantially all of such formed material is taken off at the distilling receiver. After this material is collected, 200 ppm of stannous octoate is added to the flask as a glycolysis/esterification catalyst. Additional material removed from the distilling receiver is replaced by an equal weight of diethylene glycol. The heating is carried out until the acid value of the product liquid polyol reaches 3.7. The product polyol has a hydroxyl number of 253.9, a viscosity of 2613 cps at 25° C. and contains 0.08% water.

EXAMPLE 5

Polyol Freon Solubility

Freon solubility in each of the polyols of Examples 1–4 is determined by measuring the maximum amount of trichlorofluoromethane (Freon 11, available commercially from the E.I. DuPont Company) which can be dissolved in each polyol before such becomes cloudy. This solubility is expressed in parts per hundred parts polyol (pphP).

Thus, fifty grams of polyol are added to an 180 ml beaker. The polyol, beaker, and a spatula are weighed. Freon F-11 is added with stirring to the polyol until it becomes cloudy. This mixture is then stirred until enough freon evaporates to clear the blend. The weight of freon remaining is then determined.

The results are as follows:

TABLE VI

| Polyol Freon Solubility | |
|---|---|
| Polyol | pph |
| Example 1 | 31.8 |
| Example 2 | 53.4 |
| Example 3 | 75.4 |
| Example 4 | 62.0 |

EXAMPLE 6

Resin Prepolymer

Each of the polyols of Examples 1-4 is mixed (blended with) a urethane/isocyanurate forming catalyst and with a cell stabilizing surfactant to form a resin prepolymer blend suitable for reacting with organic isocyanate to form a cellular polymer. Each such resin prepolymer blend has the following composition:

TABLE VII

| Resin Prepolymer Composition (100 wt. % total weight basis) | |
|---|---|
| Component | weight percent |
| polyol | 94 |
| potassium octoate[1] | 4 |
| silicone surfactant[2] | 2 |

Table VII footnotes
[1]Example "H"
[2]Example "I"

When the resin prepolymer blend composition of Examples 3 and 4 is admixed with Mondur MR and foamed it is found that a cellular polymer having uniform small cell sizes is produced having improved tumble friability over the foam prepared using resin prepolymer blends containing polyols of Examples 1 and 2.

EXAMPLE 7

Resin Prepolymer Freon Solubility

Freon solubility in each of these resin prepolymer blends of Example 6 is determined by measuring the maximum amount of trichlorofluoromethane (Freon 11 available commercially from the E.I. Dupont Company) which can be dissolved in each resin prepolymer blend before such becomes cloudy. Thus, solubility is expressed in parts per hundred parts resin (PPhP).

Thus, fifty grams of each resin prepolymer blend are added to an 180 ml beaker. The resin, beaker, and a spatula are weighed. Freon F-11 is added with stirring to the resin until it becomes cloudy. This mixture is then stirred until enough Freon evaporates to clear the blend. The weight of Freon remaining is then determined.

The results are as follows:

TABLE VIII

| Resin Prepolymer Freon Solubility | |
|---|---|
| Resin Prepolymer From Polyol of: | pphr |
| Example 1 | 38.4 |
| Example 2 | 53.0 |
| Example 3 | 98.0 |
| Example 4 | 90.5 |

EXAMPLES 8-15

Hydrophobic Modified Polyols Containing A Post-Formation Admixed High Molecular Weight Nonionic Surfactant Following the procedure of the preceding Example 1 various self-compatibilizing polyol blends are prepared from four-component starting mixtures containing a hydrophobic modifier.

The starting components and their respective gram quantities are shown in Table IX below. Each product polyol is a clear liquid whose acid number hydroxyl number and viscosity are also shown in such Table IX.

Each product polyol is formulated into a resin prepolymer blend as described in Example 6. Each such resin prepolymer blend is reactable with organic isocyanate to produce a cellular polymer with excellent physical properties.

Also, each product polyol and each resin prepolymer blend has admixed and dissolved therein a block copolymer of the type described in Example E. The resulting mixtures are all liquids.

Each product polyol and the corresponding resin prepolymer blend made therefrom is evaluated for Freon solubility by the respective procedures of Examples 5 and 7, and the results are shown in such Table IX. Since the Freon solubility (similarly measured) for a condensate of 1 mole of phthalic anhydride 192 grams of polyethylene terephthalate with 3 moles of diethylene glycol is about 14 pphP, the reacted hydrophobic modifier improves Freon solubility in each case. Also, the results show also that post reaction admixture of this block copolymer with a product polyol has a synergistic effect in improving the fluorocarbon solubility in the resin.

TABLE IX

| Hydrophobic Modified Phthalate-Terephthalate Polyols With And Without Post Added PO EO Block Copolymer | | | | | | | | |
|---|---|---|---|---|---|---|---|---|
| Example Number | 8 | 9 | 10 | 11 | 12 | 13 | 14 | 15 |
| Components, weight in grams | | | | | | | | |
| Phthalic Anhydride | 444 | 444 | 444 | 444 | 444 | 444 | 444 | 444 |
| Diethylene Glycol | 695.3 | 850 | 980 | 953.4 | 986.3 | 952.9 | 987 | 850 |
| Polyethylene terephthalate (Hydrophobic Modifier) | 576 | 576 | 576 | 576 | 576 | 576 | 576 | 576 |
| Alfol 12-GC | 441.6 | — | — | — | — | — | — | — |
| Soybean Oil | — | 482.7 | — | — | — | — | — | — |
| Linolenic Acid | — | — | 510.6 | — | — | — | — | — |
| Eastman Methyl Esters (1) | — | — | — | 496 | — | — | — | — |
| Oleic Acid | — | — | — | — | 510.3 | — | — | — |
| C-68 Methyl Esters (2) | — | — | — | — | — | 495.9 | — | — |
| Linoleic Acid | — | — | — | — | — | — | 510.4 | — |
| Tallow | — | — | — | — | — | — | — | 482.7 |
| Characteristics | | | | | | | | |
| Acid Number | 1.1 | 1.4 | 1.6 | 2.1 | 0.8 | 2.4 | 3.6 | 2.1 |
| Hydroxyl Number | 244.9 | 247.1 | 243.1 | 246.5 | 245.2 | 249.9 | 251.6 | 253.0 |
| Viscosity, cps at 25° C. | 1547.0 | 1898 | 879.0 | 1396 | 802.0 | 2965 | 765.0 | 1367 |
| Freon Solubility | | | | | | | | |
| Polyol, pph | 64 | 41 | 43 | 32 | 39 | 42 | 42 | 33 |
| Resin, pph | 76 | 50 | 55 | 44 | 51 | 56 | 53 | 45 |
| Polyol + 5% Block PO EO Polymer Blended, (Example E) pph | 74 | 49 | 52 | 43 | 45 | 50 | 50 | 42 |
| Resin + 5% Block PO EO Polymer | 108 | 83 | 74 | 73 | 71 | 69 | 63 | |

TABLE IX-continued

Hydrophobic Modified Phthalate-Terephthalate Polyols With And Without Post Added PO EO Block Copolymer

| Example Number | 8 | 9 | 10 | 11 | 12 | 13 | 14 | 15 |
|---|---|---|---|---|---|---|---|---|
| Blended, (Example E) pph | | | | | | | | |

Table IX Footnotes:
(1) See Example "M"
(2) See Example "K"

EXAMPLES 16–18

Tumble Friability

To illustrate tumble friability for polyurethane-polyisocyanurate foam prepared from self-compatibilized polyols of this invention, polyol blends were prepared as shown in Table X below and these blends were then converted to cellular foams using a procedure similar to that of Example 6. The foams are then evaluated for tumble friability according to ASTM procedure C421-77. The data obtained are given in Table X below and such data show that the tumble friability of the foam prepared using a polyol containing 20 percent decyl alcohol had a tumble friability of 45.73 percent. When about 5 and 10 weight percent of an Example E material is reacted into the polyol mixture, the product polyol produces polyurethane-polyisocyanurate foam with tumble friabilities of 32.53 and 24.46 percent, respectively. Thus, the mixture used in making polyol blends of this invention produces foams with superior tumble friability.

TABLE X

Tumble Friabilities Of Polyurethane-Polyisocyanurate Foams Prepared From Self-Compatibilized Phthalate Terephthalate Polyols

| Example | 16 | 17 | 18 |
|---|---|---|---|
| Components, weight in grams | | | |
| Polyethylene terephthalate | 576.0 | 576.0 | 576.0 |
| Phthalic anhydride | 444.0 | 444.0 | 444.0 |
| Diethylene glycol | 686.2 | 704.7 | 760.3 |
| Decyl alcohol | 413.05 | 313.3 | 215.8 |
| PO-EO blocked polymer | — | 104.4 | 215.8 |
| Characteristics | | | |
| Acid number | 2.8 | 1.4 | 1.5 |
| Hydroxyl number | 264.6 | 253.7 | 254.1 |
| Viscosity, CPS at 25° C. | 1140.0 | 1646.0 | 2575.0 |
| Foam Formulation | | | |
| Polyol, grams | 100.0 | 100.0 | 100.0 |
| DC-193, grams | 1.0 | 1.0 | 1.0 |
| Hexcem 977, grams | 4.0 | 3.2 | 2.7 |
| TMR-30, grams | 0.8 | 0.6 | 0.5 |
| Freon 11, grams | 52.0 | 50.0 | 51.0 |
| PAPI-27, grams | 201.3 | 191.0 | 190.6 |
| Foam Properties | | | |
| Density, PCF | 1.78 | 1.76 | 1.79 |
| Tumble friability, % (ASTM C421-77) | 45.73 | 32.53 | 24.46 |

EXAMPLES 19–24

Hydrophobic Modified Polyols Containing Reacted Nonionic Surfactant

Following the procedure of the preceding Example 1, various self-compatibilizing polyol blends are prepared from four and five component starting mixtures each containing the same hydrophobic modifier.

The starting components and their respective gram quantities are shown in Table XI below. Each product polyol is a clear liquid whose acid number, hydroxyl number and viscosity are shown also in such Table XI.

Each product polyol is formulated into a resin prepolymer blend as described in Example 6. Each such resin prepolymer is reactable with organic isocyanate to produce a cellular polymer with excellent physical properties.

Each product polyol and the corresponding resin prepolymer blend made therefrom is evaluated for Freon solubility using Freon 11 (trichlorofluoromethane) by the respective procedures of Examples 5 and 7. The results are shown in such Table XI.

Since the Freon solubility (similarly measured) for a condensate of 1 mole of phthalic anhydride, 192 grams of polyethylene terephthalate with 3 moles of diethylene glycol is about 14 pphP, the four component hydrophobic modified product polyol of Example 19 has improved Freon solubility by comparison. Also, each of the five component hydrophobic modified, nonionic surfactant modified product polyols of Examples 20-24 has improved Freon solubility by comparison to the product polyol of Example 19.

When 5 weight percent of Example E material is postblended with the Example 19 polyol, and freon solubility is measured, using the same freon, it is found that the maximum solubility is about the same as for the Example 20 polyol wherein the Example E material has been reacted. However, this freon solubility level is characteristically surprisingly higher than the freon solubility level achieved when a comparable amount of Example E material is dissolved in the phthalate-terephthalate polyol of Example A where no hydrophobic compound is present. Consequently, the present invention makes possible the achievement of polyester polyol blends using formula (1) diols which are fluorocarbon compatibilizable with a propoxylate ethoxylate compound of the type taught, for example, in Wood U.S. Pat. No. 4,529,744, but, in the present polyol blend compositions, the same level of fluorocarbon solubility is achieved with a surprisingly smaller amount of such a propoxylate ethoxylate compound because of the presence in the present polyol blends of the reacted hydrophobic compound.

TABLE XI

Hydrophobic Modified Phthalate-Terephthalate Polyols Containing Reacted Nonionic Surfactant

| Example Number | 19 | 20 | 21 | 22 | 23 | 24 |
|---|---|---|---|---|---|---|
| Component, weight in grams | | | | | | |
| Polyethylene terephthalate | 576 | 576 | 576 | 576 | 576 | 576 |
| Phthalic Anhydride | 222 | 222 | 222 | 222 | 222 | 222 |

TABLE XI-continued

Hydrophobic Modified Phthalate-Terephthalate Polyols Containing Reacted Nonionic Surfactant

| Example Number | 19 | 20 | 21 | 22 | 23 | 24 |
|---|---|---|---|---|---|---|
| Diethylene Glycol | 616.7 | 660.9 | 658.6 | 647.3 | 645.8 | 643.4 |
| (Hydrophobic Modifier) Eastman Methyl Esters[1] | 358.6 | 394.3 | 393.7 | 390.6 | 390.1 | 389.5 |
| (Nonionic Surfactants) | | | | | | |
| Block PO-EO Polymer (2) | — | 94 | — | — | — | — |
| Pluronic P-65 (3) | — | — | 93.8 | — | — | — |
| Makon 6 (4) | — | — | — | 93.1 | — | — |
| Varonic K-215 (5) | — | — | — | — | 93 | — |
| Amidox C-5 (6) | — | — | — | — | — | 92.8 |
| Analysis | | | | | | |
| Acid Number | 2.3 | 2.4 | 4.0 | 1.5 | 3.1 | 0.9 |
| Hydroxyl Number | 243.9 | 245.0 | 246.2 | 241.3 | 249.9 | 239.8 |
| Viscosity, cps at 25° C. | 1869 | 1541 | 2424 | 1889 | 1569 | 1410 |
| Freon Solubility | | | | | | |
| Polyol, pph | 33.9 | 38.4 | 39.4 | 44.9 | 43.1 | 41.3 |
| Resin, pph | 48.9 | 64.6 | 64.1 | 60.1 | 55.8 | 54.8 |

Table XII Footnotes:
(1) See Example M
(2) Same polymer as described in Example E
(3) See Example O
(4) See Example P
(5) See Example N
(6) See Example L

EXAMPLE 25

The procedure of Example C is repeated except that 247.3 grams (1.57 moles) of decyl alcohol and 247.3 grams, (0.066 moles) of PO-EO block polymer (Example E) are also present during the reaction. The product is a liquid polyol having a viscosity of about 15,000 centipoises at 25° C. and a hydroxyl number of 320.

Preferably a given mixture of phthalic anhydride bottoms composition, polyol, polyethylene terephthalate, hydrophobic modifier and nonionic surfactant in order for glycolysis/esterification to occur, is heated with mixing at a temperature ranging from about 190° to 240° C. (preferably from about 210° to 240° C.) under liquid phase conditions. This heating or contacting between hydrophobic modifier, nonionic surfactant, polyethylene terephthalate, polyol, and phthalic anhydride bottoms composition is continued until a desired extent of esterification has been achieved. Preferably such heating is continued until the resulting product reaches a hydroxyl number ranging from about 200 to 500 and an acid number ranging from about 0.5 to 7, and more preferably until such reaches a hydroxyl number ranging from about 270 to 400 and an acid number ranging from about 2 to 7.

It is surprising and unexpected fact that, despite the complex nature of the composition produced by reacting polyethylene terephthalate and phthalic anhdyride bottoms with a diol of formula (1), a hydrophobic modifier and nonionic surfactant as described herein there is produced a product polyol blend which can be readily and simply utilized for reaction with isocyanate to produce (in the presence of appropriate catalyst) polyisocyanurate foams which have excellent properties that appear generally to be about equal to the properties of corresponding foams made with esters produced by reacting polyethylene terephthalate and substantially pure phthalic anhydride with polyol of formula (1) as in Example A.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

We claim:

1. A process for preparing a low acid number self-compatibilizing polyester polyol product blend based on polyalkylene terephthalate comprising the step of heating at a temperature ranging from about 180° to 240° C. a starting mixture which comprises on a 100 weight percent total basis:
(A) from about 15 to 80 weight percent of polyalkylene terephthalate;
(B) from about 8 to 80 weight percent of at least one low molecular weight aliphatic diol characterized by the generic formula:

$$HO-R^1-OH$$

where:
$R^1$ is a divalent radical selected from the group consisting of:
(a) alkylene radicals each containing from 2 through 6 carbon atoms,
(b) radicals of the formula:

$$-(R^3O)_n-R^3-$$

where:
$R^3$ is an alkylene radical containing from 2 through 3 carbon atoms, and n is an integer of from 1 through 3, and
(c) mixtures thereof, and
(C) from about 2 to 30 weight percent of at least one compatibilizer compound selected from the group consisting of hydrophobic compounds, nonionic surfactant compounds, and mixtures thereof, said hydrophobic compound being characterized by:
(1) having an equivalent weight of from about 130 to 900,
(2) containing from about 8 to 60 carbon atoms per molecule, and (3) containing one radical per molecule, selected from the group consisting of carboxyl and hydroxyl, and said nonionic surfactant compound being characterized by:

(1) containing from about 10 to 600 carbon atoms per molecule, (2) containing at least one and not more than four hydroxyl radicals per molecule, and (3) containing from about 4 to 270 radicals per molecule of the formula $$-(R^3O)-$$

where:

$R^3$ is as above defined, said heating being continued until a liquid reaction product is produced which is characterized by having:

(A) an hydroxyl number ranging from about 200 to 500, (B) an acid number ranging from about 0.1 to 7, (C) a saponification value ranging from about 130 to 400, and (D) a viscosity ranging from about 200 to 50,000 centipoises at 25° C. measured using a Brookfield viscometer.

2. The process of claim 1 wherein said compatibilizer compound comprises said hydrophobic compound.

3. The process of claim 1 wherein said compatibilizer compound comprises said nonionic surfactant compound.

4. The process of claim 1 wherein both said hydrophobic compound and said nonionic surfactant compound are present, and wherein the weight ratio of said hydrophobic compound to said nonionic surfactant compound is in the range from about 0.1 to 10.

5. The process of claim 1 wherein said nonionic surfactant compound comprises at least one nonionic propoxylate ethoxylate compound having a molecular weight of from about 1,200 to 13,000.

6. The process of claim 5 wherein said propoxylate ethoxylate compound is characterized by having:

(1) a molecular weight of at least from about 3000 to 8000, (2) a solubility in diethylene glycol phthalate to such an extent that at least 5 parts by weight are soluble in each 100 parts by weight of a diethylene glycol phthalate which is a stoichiometric reaction product of one mole of phthalic acid anhydride with two moles of diethylene glycol or equivalent, (3) at least one block polyoxypropylene group which contains from about 10 to 70 repeating propoxy units, and (4) at least one block polyoxyethylene group which contains from about 15 to 200 repeating ethoxy units. provided that the total alkoxyl content includes at least about 40 weight percent of ethylene oxide.

7. The process of claim 1 wherein, after said heating, for each 70 parts by weight of such reaction product, from 0 to about 30 parts by weight of at least one said compatibilizer compound is admixed therewith provided that the total quantity of said compatibilizer compound present in said product blend ranges from greater than 0 to about 30 part by weight for each 100 parts by weight of total product blend.

8. The process of claim 1 wherein said starting mixture includes from greater than 0 to about 60 weight percent on a total starting mixture basis of at least one dibasic carboxylic acid compound, such a compound being characterized by:

(1) containing from 2 to about 35 carbon atoms per molecule, (2) containing two carboxyl groups per molecule, and (3) containing at least one and no more than two functional groups consisting of a carboxylic acid, a carboxylic acid anhydride, a carboxylic ester, a hydroxyl containing compound or mixtures thereof.

9. The process of claim 8 wherein said nonionic surfactant compound comprises a mixture of at least one nonionic propoxylate ethoxylate compound having a molecular weight of from about 1,200 to 13,000.

10. The process of claim 8 wherein said propoxylate ethoxylate compound is characterized by having:

(1) a molecular weight of at least from about 3000 to 8000, (2) a solubility in diethylene glycol phthalate to such an extent that at least 5 parts by weight are soluble in each 100 parts by weight of a diethylene glycol phthalate which is a stoichiometric reaction product of one mole of phthalic acid anhydride with two moles of diethylene glycol or equivalent, (3) at least one block polyoxypropylene group which contains from about 10 to 70 repeating propoxy units, and (4) at least one block polyoxyethylene group which contains from about 15 to 200 repeating ethoxy units. provided that the total alkoxyl content includes at least about 40 weight percent of ethylene oxide.

11. The process of claim 8 wherein, after said heating, for each 70 parts by weight of such reaction product, from 0 to about 30 parts by weight of at least one said compatibilizer compound is admixed therewith provided that the total quantity of said compatibilizer compound present in said product blend ranges from greater than 0 to about 30 parts by weight for each 100 parts by weight of total product blend.

12. The process of claim 1 wherein during said heating said starting mixture further contains on such 100 weight percent total starting mixture basis from greater than 0 to about 10 weight percent of at least one further polyol selected from the group consisting of glycerol, trimethylolpropane, sorbitol, trimethylolethane, pentaerythritol, and mixtures thereof.

13. The process of claim 8 wherein said dibasic carboxylic acid compound comprises an aromatic material selected from the group consisting of phthalic acid anhydride, phthalic acid, terephthalic acid, and dimethyl terephthalate, and isophthalic acid.

14. The process of claim 8 wherein during said heating said starting mixture further contains, on such 100 weight percent total starting mixture basis, from greater than 0 to about 10 weight percent of at least one further polybasic carboxylic acid compound selected from the group consisting of trimellitic anhydride, trimellitic acid, and mixtures thereof.

15. The process of claim 8 wherein during said heating said carboxylic acid compound comprises an aliphatic material selected from the group consisting of adipic acid, glutaric acid, succinic acid, their respective alkyl esters, and mixtures thereof.

16. The process of claim 8 wherein said dibasic carboxylic acid compound comprises phthalic anhydride.

17. The process of claim 1 wherein during said heating said temperature ranges from about 200° to 240° C.

18. The process of claim 8 wherein said dibasic carboxylic acidic compound comprises phthalic anhydride, said aliphatic diol comprises diethylene glycol, said hydrophobic compound comprises decyl alcohol, and said nonionic surfactant compound comprises a nonionic propoxylate ethoxylate compound which is characterized by having:

(1) a molecular weight of at least from about 3000 to 8000, (2) a solubility in diethylene glycol phthalate to such an extent that at least 5 parts by weight are soluble in each 100 parts by weight of a diethylene glycol phthalate (which is a stoichiometric reaction product of one mole of phthalic acid anhydride with two moles of diethylene glycol (or equivalent), (3) at least one block polyoxypropylene group which contains from about 10 to 70 repeating propoxy units, (4) at least one block polyoxyethylene group which contains from about 15 to 200 repeating ethoxy units, and (5) both a hydrophobic moiety and hydrophilic moiety, provided that the total alkoxyl content includes at least about 40 weight percent of ethylene oxide.

19. A self-compatibilized polyester polyol product blend comprising a reaction product of a starting mixture which starting mixture comprises on a 100 weight percent total basis:

(A) from about 15 to 80 weight percent of polyalkylene terephthalate.

(B) from about 8 to 80 weight percent of at least one low molecular weight aliphatic diol characterized by the generic formula:

HO—R$^1$—OH where:

R$^1$ is a divalent radical selected from the group consisting of (a) alkylene radicals each containing from 2 through 6 carbon atoms, and (b) radicals of the formula:

—(R$^3$O)$_n$—R$^3$— where:

R$^3$ is an alkylene radical containing from 2 through 3 carbon atoms, and n is an integer of from 1 through 3, and (c) mixtures thereof, and (C) from greater than 0 to about 30 weight percent of at least one compatibilizer compound selected from the group consisting of hydrophobic compounds, nonionic surfactant compounds, and mixtures thereof, said hydrophobic compound being characterized by:

(1) having an equivalent weight of from about 130 to 900, (2) containing from about 8 to 60 carbon atoms per molecule, and (3) containing one radical per molecule, selected from the group consisting of carboxyl and hydroxyl, and said nonionic surfactant compound being characterized by:

(1) containing from about 10 to 600 carbon atoms per molecule, (2) containing at least one and not more than four hydroxyl radicals per molecule, and (3) containing from about 4 to 270 radicals per molecule of the formula

—(R$^3$O)— where:

R$^3$ is as above defined.

said reaction product being a liquid which is characterized by having:

(i) an hydroxyl number ranging from about 200 to 500, (ii) an acid number ranging from about 0.10 to 7.0, (iii) a saponification value ranging from about 130 to 400, and (iv) a viscosity ranging from about 200 to 50,000 centipoises measured at 25° C. using a Brookfield viscometer.

20. The product blend of claim 19 wherein said starting mixture includes from greater than 0 to about 60 weight percent on a total starting mixture basis of at least one dibasic carboxylic acid compound, such a carboxylic acid compound being characterized by:

(1) containing from 2 to about 35 carbon atoms per molecule, (2) containing two carboxyl groups per molecule, and (3) containing at least one and no more than two functional groups consisting of a carboxylic acid, a carboxylic anhydride, a carboxylic ester, a hydroxyl containing compound, or a mixture thereof.

21. The product blend of claim 20 wherein said compatibilizer compound comprises a mixture of said hydrophobic compound and said nonionic surfactant compound wherein the weight ratio of said hydrophobic compound to said nonionic surfactant compound is in the range from about 0.1 to 10.

22. The product blend of claim 20 wherein said compatibilizer compound comprises at least one hydrophobic compound.

23. The product blend of claim 20 wherein said compatibilizer compound comprises at least one nonionic surfactant compound.

24. The product blend of claim 20 wherein said nonionic surfactant compound comprises at least one nonionic propoxylate ethoxylate compound having a molecular weight of from about 1,200 to 13,000.

25. The product blend of claim 24 wherein said nonionic propoxylate ethoxylate compound is characterized by having:

(1) a molecular weight of at least from about 3000 to 8000, (2) a solubility in diethylene glycol phthalate to such an extent that at least 5 parts by weight are soluble in each 100 parts by weight of a diethylene glycol phthalate which is a stoichiometric reaction product of one mole of phthalic acid anhydride with two moles of diethylene glycol or equivalent, (3) at least one block polyoxypropylene group which contains from about 10 to 70 repeating propoxy units, and (4) at least one block polyoxyethylene group which contains from about 15 to 200 repeating ethoxy units, provided that the total alkoxyl content includes at least about 40 weight percent of ethylene oxide.

26. The product blend of claim 20 wherein for each 70 parts by weight of said reaction product there is additionally added from 0 to about 30 parts by weight of at least one said compatibilizer compound provided that the total quantity of said compatibilizer compound present in each product blend ranges from greater than 0 to about 30 parts by weight for each 100 parts of said product blend.

27. The product blend of claim 20 wherein said dibasic carboxylic acid compound comprises a material selected from the group consisting of phthalic acid, phthalic anhydride, terephthalic acid, dimethyl terephthalate, and isophthalic acid.

28. The product blend of claim 26 wherein said starting mixture further contains at least one nonionic propoxylate ethoxylate compound having a molecular weight of from about 1200 to 13,000.

29. The product blend or claim 28 wherein said dibasic carboxylic acidic compound comprises phthalic anhydride, said aliphatic diol comprises diethylene glycol, said hydrophobic compound comprises decyl alcohol, and said nonionic surfactant compound comprises a nonionic propoxylate ethoxylate compound is characterized by having:

(1) a molecular weight of at least from about 3000 to 8000,
(2) a solubility in diethylene glycol phthalate to such an extent that at least 5 parts by weight are soluble in each 100 parts by weight of a diethylene glycol phthalate which is a stoichiometric reaction product of one mole of phthalic acid anhydride with two moles of diethylene glycol or equivalent,
(3) at least one block polyoxypropylene group which contains from about 10 to 70 repeating propoxy units,
(4) at least one block polyoxyethylene group which contains from about 15 to 200 repeating ethoxy units, and
(5) both a hydrophobic moiety and a hydrophilic moiety, provided that the total alkoxyl content includes at least about 40 weight percent of ethylene oxide.

30. The product blend of claim 20 wherein said propoxylate ethoxylate compound is further characterized by having an ethylene oxide content which ranges from about 55 to 75 weight percent based on total alkoxyl content.

31. The product blend of claim 30 wherein said propoxylate ethoxylate compound is further characterized by having an ethylene oxide content which ranges from about 60 to 70 weight percent based on total alkoxyl content.

* * * * *